Patented Oct. 14, 1924.

1,511,912

UNITED STATES PATENT OFFICE.

RAGNAR SANDAHL, OF STOCKHOLM, SWEDEN, ASSIGNOR TO OSCAR LUDVIG CHRISTENSON, OF STOCKHOLM, SWEDEN.

PROCESS OF PRODUCING SALTS OF AMMONIA.

No Drawing. Application filed August 20, 1923. Serial No. 658,446.

*To all whom it may concern:*

Be it known that I, RAGNAR SANDAHL, a citizen of the Kingdom of Sweden, residing at Stockholm, Sweden, have invented new and useful Improved Processes of Producing Salts of Ammonia, of which the following is a specification.

This invention relates to an improved process of producing salts of ammonia from the ammonia contained in the gases obtained in the destructive distillation or gasification of carbon, peat and other organic matters.

The object of the invention is to produce salts of ammonium in such a manner that the salts may be directly collected, substantially free from tar and in a dry state, and thus the expensive evaporation of the solutions of ammonia salts hitherto produced may be avoided.

The inventon consists, chiefly, in first removing the tar from the crude gases, then mixing the hot distilling gases with an acid in gaseous state and collecting the salt of ammonia formed while avoiding the condensing of the steam contained in the gases.

The invention may be carried out for instance in the following manner. The hot gases produced in a gas work, a coke oven or a gas generator are cooled to a temperature at which the tar contained in the gases is condensed and may be separated from the gas while the steam and ammonia still remain in gaseous state. Such temperature should preferably not exceed 150° C. but must be above 100° C. After the removal of the tar and while the gas still is at a temperature of between 100 and 150° C. an acid in gaseous state is injected in the gas. I prefer to use hydrochloric acid but also phospharic acid or nitric acid may be used. The acid used reacts with the ammonia contained in the gas to form the corresponding salt of ammonia as a fine fume which is deposited in suitable settling chambers or may be precipitated electrically as in a Cottrell or similar apparatus. For obtaining the salts in a dry state the precipitation thereof is carried out at a temperature above 100° C., thus preventing the steam contained in the gases from being condensed.

What I claim is:—

1. The process of producing salts of ammonia from the ammonia contained in the crude gases obtained in the destructive distillation or gasification of carbon, peat and other organic matters, which comprises first removing the tar from crude gases, then mixing the remaining gases at a temperature above 100° C. with an acid in gaseous state, and collecting the salt of ammonia formed at such a temperature as to avoid the condensing of the steam contained in the gases.

2. The process of producing ammonium chloride from the ammonia contained in the gases obtained in the destructive distillation or gasification of carbon, peat and other organic matters, which comprises first purifying the crude gases from tar, then mixing the hot purified gases with hydrochloric acid in gaseous state, and collecting the ammonium chloride formed at such temperature that condensation of the steam contained in the gases is avoided.

In testimony whereof I have signed my name.

RAGNAR SANDAHL.